(12) United States Patent
Chen et al.

(10) Patent No.: US 9,984,282 B2
(45) Date of Patent: May 29, 2018

(54) SYSTEMS AND METHODS FOR DISTINGUISHING FACIAL FEATURES FOR COSMETIC APPLICATION

(71) Applicant: Perfect Corp., New Taipei (TW)

(72) Inventors: Wei-Ming Chen, Tainan (TW); Chih-Yu Cheng, Taipei (TW)

(73) Assignee: PERFECT CORP., New Taipei (TW)

( * ) Notice: Subject to any disclaimer, the term of this patent is extended or adjusted under 35 U.S.C. 154(b) by 69 days.

(21) Appl. No.: 15/373,768

(22) Filed: Dec. 9, 2016

(65) Prior Publication Data
US 2017/0169285 A1    Jun. 15, 2017

Related U.S. Application Data

(60) Provisional application No. 62/265,472, filed on Dec. 10, 2015.

(51) Int. Cl.
*G06K 9/00* (2006.01)

(52) U.S. Cl.
CPC ..... *G06K 9/00268* (2013.01); *G06K 9/00228* (2013.01)

(58) Field of Classification Search
CPC .............. G06K 9/00268; G06K 9/00228
See application file for complete search history.

(56) References Cited

U.S. PATENT DOCUMENTS

| 5,878,156 | A | * | 3/1999 | Okumura | G06K 9/00268 340/575 |
| 5,905,807 | A | * | 5/1999 | Kado | A61B 5/1176 375/E7.083 |
| 6,571,003 | B1 | * | 5/2003 | Hillebrand | A61B 5/0064 382/100 |
| 7,634,103 | B2 | * | 12/2009 | Rubinstenn | A45D 44/005 345/619 |
| 8,908,904 | B2 | * | 12/2014 | Santos | H04N 5/23229 382/100 |
| 9,858,473 | B2 | * | 1/2018 | Izumi | G06K 9/00268 |

(Continued)

OTHER PUBLICATIONS

Vahid Kazemi and Josephine Sullivan, "One Millisecond Face Alignment with an Ensemble of Regression Trees" In Proc. IEEE Conference on Computer Vision and Pattern Recognition (CVPR 2014).

*Primary Examiner* — John Strege
(74) *Attorney, Agent, or Firm* — McClure, Qualey & Rodack, LLP (57) ABSTRACT

A media editing device obtains a digital image, and a facial region of an individual in the digital image is identified by a facial region analyzer. A plurality of facial features of the facial region is identified by a facial feature identifier. A skin color of the facial region is determined, and eyebrow regions in the facial region are identified based on the facial features. Each of the eyebrow regions is partitioned into a plurality of segments, and a determination is made, for one or more of the segments, whether an area above or an area below the segment has a color matching the skin color. The segment is designated as a verified eyebrow region or as an overlapped region depending on whether the area above or the area below the segment has a color matching the skin color. A special effect is applied on the verified eyebrow region.

23 Claims, 7 Drawing Sheets

(56) References Cited

U.S. PATENT DOCUMENTS

| | | | | |
|---|---|---|---|---|
| 2001/0037191 A1* | 11/2001 | Furuta | ............... | G06Q 10/087 703/6 |
| 2004/0161134 A1* | 8/2004 | Kawato | ............. | G06K 9/00228 382/118 |
| 2005/0135675 A1* | 6/2005 | Chen | ............. | G06T 11/00 382/162 |
| 2007/0019882 A1* | 1/2007 | Tanaka | ............. | G06T 17/20 382/276 |
| 2008/0232650 A1* | 9/2008 | Suzuki | ............. | G06K 9/00281 382/118 |
| 2008/0267443 A1* | 10/2008 | Aarabi | ............. | G06K 9/00234 382/100 |
| 2009/0148006 A1* | 6/2009 | Hayasaki | ............. | G06K 9/00221 382/118 |
| 2010/0288295 A1* | 11/2010 | Kamada | ............. | G06T 11/00 132/200 |
| 2012/0027269 A1* | 2/2012 | Fidaleo | ............. | G06Q 30/0268 382/118 |
| 2012/0044335 A1* | 2/2012 | Goto | ............. | A45D 44/005 348/77 |
| 2012/0299945 A1* | 11/2012 | Aarabi | ............. | G06K 9/00281 345/589 |
| 2015/0254500 A1* | 9/2015 | Izumi | ............. | G06T 11/60 348/78 |
| 2016/0125229 A1* | 5/2016 | Soare | ............. | G06K 9/00248 382/118 |
| 2016/0267320 A1* | 9/2016 | Ohta | ............. | G06T 5/005 |

* cited by examiner

SYSTEMS AND METHODS FOR DISTINGUISHING FACIAL FEATURES FOR COSMETIC APPLICATION

CROSS-REFERENCE TO RELATED APPLICATION

This application claims priority to, and the benefit of, U.S. Provisional Patent Application entitled, "System and Method for Distinguishing Hair and Eyebrows for Cosmetic Application," having Ser. No. 62/265,472, filed on Dec. 10, 2015, which is incorporated by reference in its entirety.

TECHNICAL FIELD

The present disclosure generally relates to editing multimedia content and more particularly, to a system and method for distinguishing facial features such as hair and eyebrows for cosmetic application.

BACKGROUND

As smartphones and other mobile devices have become ubiquitous, people have the ability to take digital images virtually any time. However, the process of selecting and incorporating special effects to further enhance digital images can be challenging and time-consuming. Specifically, when applying special effects to an individual's face, it can be difficult to distinguish between facial features. For example, when applying special effects to simulate the appearance of cosmetic makeup, the individual's hair and eyebrows may overlap in some instances when applying eyebrow makeup, thereby making the editing process more difficult.

SUMMARY

Briefly described, one embodiment, among others, is a method implemented in a media editing device. The method comprises obtaining a digital image depicting an individual with hair overlapping a portion of at least one eyebrow of the individual, the hair overlapping the portion of the at least one eyebrow at an angle. The method further comprises identifying a facial region of an individual in the digital image by a facial region analyzer, identifying a plurality of facial features of the facial region by a facial feature identifier, and determining a skin color of the facial region. The method further comprises identifying eyebrow regions in the facial region based on the facial features, partitioning each of the eyebrow regions into a plurality of segments, and determining, for one or more of the segments, whether an area above or an area below the segment has a color matching the skin color. The method further comprises designating the segment as a verified eyebrow region in response to determining that the area above or that the area below the segment has a color matching the skin color. The method further comprises designating the segment as an overlapped region in response to determining that the area above or that the area below the segment does not have a color matching the skin color. The method further comprises applying a special effect on the verified eyebrow region.

Another embodiment is a system that comprises a memory storing instructions and a processor coupled to the memory and configured by the instructions to obtain a digital image depicting an individual with hair overlapping a portion of at least one eyebrow of the individual, the hair overlapping the portion of the at least one eyebrow at an angle. The processor is further configured by the instructions to identify a facial region of an individual in the digital image by a facial region analyzer, identify a plurality of facial features of the facial region by a facial feature identifier, and determine a skin color of the facial region. The processor is further configured by the instructions to identify eyebrow regions in the facial region based on the facial features, partition each of the eyebrow regions into a plurality of segments, and determine, for one or more of the segments, whether an area above or an area below the segment has a color matching the skin color. The processor is further configured by the instructions to designate the segment as a verified eyebrow region in response to determining that the area above or that the area below the segment has a color matching the skin color. The processor is further configured by the instructions to designate the segment as an overlapped region in response to determining that the area above or that the area below the segment does not have a color matching the skin color. The processor is further configured by the instructions to apply a special effect on the verified eyebrow region.

Another embodiment is a non-transitory computer-readable medium embodying a program executable in a computing device, comprising code for obtaining a digital image depicting an individual with hair overlapping a portion of at least one eyebrow of the individual, the hair overlapping the portion of the at least one eyebrow at an angle. The program further comprises code for identifying a facial region of an individual in the digital image by a facial region analyzer, code for identifying a plurality of facial features of the facial region by a facial feature identifier, and code for determining a skin color of the facial region. The program further comprises code for identifying eyebrow regions in the facial region based on the facial features, code for partitioning each of the eyebrow regions into a plurality of segments, and code for determining, for one or more of the segments, whether an area above or an area below the segment has a color matching the skin color. The program further comprises code for designating the segment as a verified eyebrow region in response to determining that the area above or that the area below the segment has a color matching the skin color. The program further comprises code for designating the segment as an overlapped region in response to determining that the area above or that the area below the segment does not have a color matching the skin color. The program further comprises code for applying a special effect on the verified eyebrow region.

Another embodiment is a method implemented in a media editing device. The method comprises obtaining a digital image depicting an individual with hair overlapping a portion of at least one eyebrow of the individual, the hair overlapping the portion of the at least one eyebrow at an angle. The method further comprises identifying a facial region of an individual in the digital image by a facial region analyzer, identifying a plurality of facial features of the facial region by a facial feature identifier, and determining a hair color of the facial region. The method further comprises identifying eyebrow regions in the facial region based on the facial features, partitioning each of the eyebrow regions into a plurality of segments, and determining, for one or more of the segments, whether an area above or an area below the segment has a color matching the hair color. The method further comprises designating the segment as an overlapped region in response to determining that the area above or that the area below the segment has a color matching the hair color. The method further comprises designating the segment as a verified eyebrow region in response to determining that the area above or that the area below the segment does not have a color matching the hair color. The method further comprises applying a special effect to the verified eyebrow region.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Various embodiments are disclosed for analyzing attributes associated with digital images and automatically applying special effects to target regions based on the analysis. The special effects may comprise, but are not limited to, one or more graphics applied to the facial region of an individual depicted in the digital image. For example, the graphics may be applied to simulate the appearance of cosmetic make-up applied to the individual's face. Hair (e.g., bangs) and eyebrows may overlap in some instances when performing eyebrow makeup. When utilizing computerized imaging during the editing process, the system must distinguish hair and eyebrows, otherwise special effects (e.g., eyeliner) may be inadvertently applied to certain regions (e.g., regions where the hair and eyebrows overlap), thereby yielding an undesirable result.

Various embodiments achieve the technical effect of distinguishing facial features and applying special effects to target regions that are identified after distinguishing between facial features. Specifically, various embodiments enhance the accuracy of eyebrow detection by detecting the boundary of the hair region and extending of the hair region at one or more regions where the hair region and an eyebrow overlap or intersect. Due to overlapping of the hair and eyebrow regions, the boundary between the hair region and eyebrow region becomes difficult to determine, thereby resulting in discontinuity or inaccurate application of the cosmetic effect. The disclosed algorithm results in more accurate detection of the hair-eyebrow boundary, thereby resulting in more accurate application of the cosmetic effect.

Figure 1:
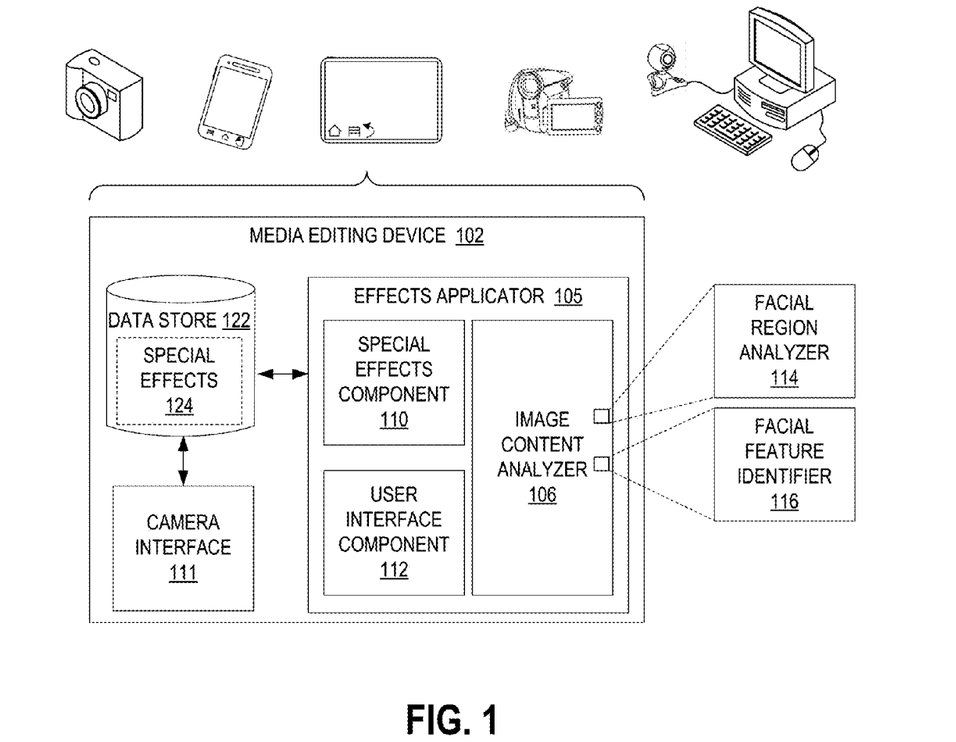
FIG. 1 is a block diagram of a media editing device in which the hair-eyebrow detection techniques disclosed herein may be implemented in accordance with various embodiments of the present disclosure.

FIG. 1 is a block diagram of a media editing device 102 in which the feature detection and image editing techniques disclosed herein may be implemented. The media editing device 102 may be embodied as a computing device equipped with digital content recording capabilities such as, but not limited to, a digital camera, a smartphone, a tablet computing device, a digital video recorder, a laptop computer coupled to a webcam, and so on.

An effects applicator 105 executes on a processor of the media editing device 102 and includes various components including an image content analyzer 106, a special effects component 110, and a user interface component 112. The image content analyzer 106 is configured to analyze the content of digital images captured by the camera module 111 and/or received from a remote source. The image content analyzer 106 may also be configured to analyze content of digital images stored on a storage medium such as, by way of example and without limitation, a compact disc (CD), a universal serial bus (USB) flash drive, or cloud storage, wherein the digital images may then be transferred and stored locally on a hard drive of the media editing device 102.

The digital images processed by the image content analyzer 106 may be received by a media interface component (not shown) and encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or other digital formats.

Note that the digital images may also be extracted from media content encoded in other formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

The image content analyzer 106 determines characteristics of the content depicted in digital images and includes a facial region analyzer 114 and a facial feature identifier 116. The facial region analyzer 114 analyzes attributes of each individual depicted in the digital images and identifies the general location of the individual's face in addition to the general location of facial features such as the individual's eyes, nose, mouth, and so on. Based on the analysis performed by the facial region analyzer 114, the facial feature identifier 116 identifies target points (e.g., eyes, nose, mouth) within the facial region, where one or more cosmetic special effects are then applied to the target regions.

In some instances, the target points may represent the eyebrows of an individual depicted in the media content. In such instances, the facial feature identifier 116 can be configured to distinguish the eyebrows of the individual from other facial features that may overlap with the eyebrows, namely the individual's hair and further refine the boundaries of the respective facial features. Based on the target points defined by the facial feature identifier 116, the special effects component 110 applies one or more cosmetic special effects to the identified facial feature. For example, the special effects component 110 may apply a particular color of cosmetic makeup (e.g., eyeliner) to the eyebrows identified by the facial feature identifier 116. In this regard, the special effects component 110 may be configured to apply special effects intended for the eyebrow only to a verified eyebrow region, as described in more detail below.

The user interface component 112 is configured to provide a user interface to the user of the image editing device and allow the user to specify which special effects 124 to apply to the media content, where the special effects 124 may be obtained from a data store 122 in the media editing device 102. The special effects component 110 then applies the obtained special effect 124 to the target region identified by the facial feature identifier 116.

Figure 2:
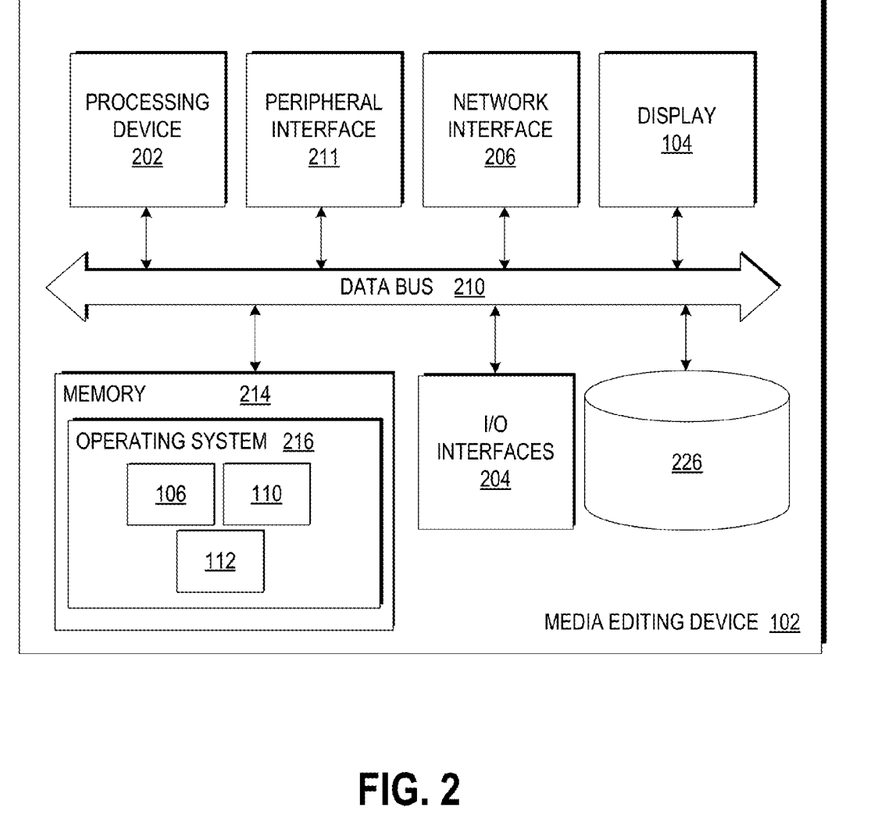
FIG. 2 is a schematic diagram of the media editing device of FIG. 1 in accordance with various embodiments of the present disclosure.

FIG. 2 illustrates a schematic block diagram of the media editing device 102 in FIG. 1. The media editing device 102 may be embodied in any one of a wide variety of wired and/or wireless computing devices, such as a desktop computer, portable computer, dedicated server computer, multi-processor computing device, smart phone, tablet, and so forth. As shown in FIG. 2, each of the media editing device 102 comprises memory 214, a processing device 202, a number of input/output interfaces 204, a network interface 206, a display 104, a peripheral interface 211, and mass storage 226, wherein each of these components are connected across a local data bus 210.

The processing device 202 may include any custom made or commercially available processor, a central processing unit (CPU) or an auxiliary processor among several processors associated with the media editing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the media editing device 102 depicted in FIG. 1. In accordance with such embodiments, the components are stored in memory 214 and executed by the processing device 202, thereby causing the processing device 202 to perform the operations/functions relating to track management disclosed herein. One of ordinary skill in the art will appreciate that the memory 214 can, and typically will, comprise other components which have been omitted for purposes of brevity. For some embodiments, the image content analyzer 106 comprising the facial region analyzer 114 and the facial feature identifier 116 can be implemented by hardware and/or software.

Input/output interfaces 204 provide any number of interfaces for the input and output of data. For example, where the media editing device 102 comprises a personal computer, these components may interface with one or more user input/output interfaces 204, which may comprise a keyboard or a mouse, as shown in FIG. 2. The display 104 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
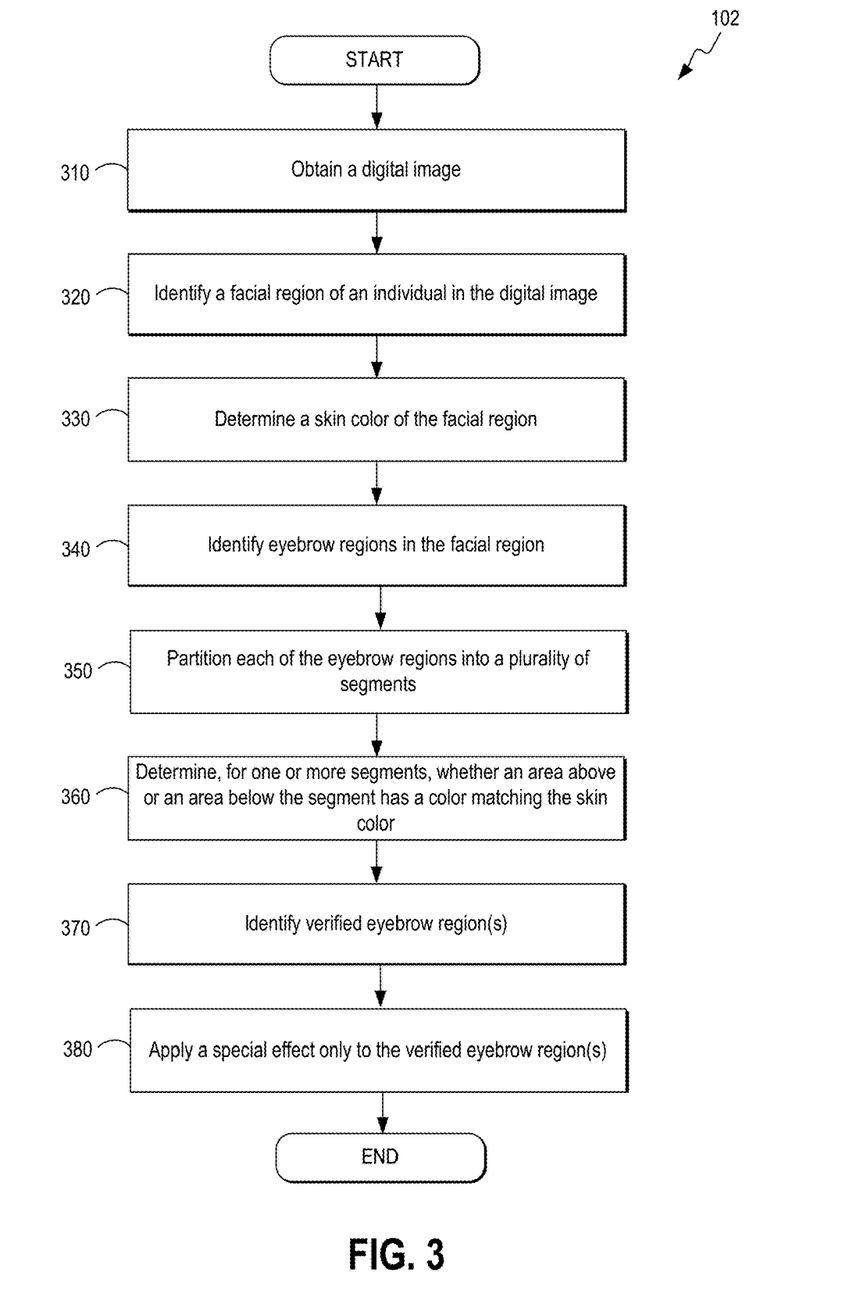
FIG. 3 is a top-level flowchart illustrating examples of functionality implemented as portions of the media editing device of FIG. 1 for hair-eyebrow detection according to various embodiments of the present disclosure.

Reference is made to FIG. 3, which is a flowchart in accordance with various embodiments for hair-eyebrow detection for facilitating multimedia editing performed by the media editing device 102 of FIG. 1. It is understood that the flowchart of FIG. 3 provides merely an example of the different types of functional arrangements that may be employed to implement the operation of the various components of the media editing device 102. As an alternative, the flowchart of FIG. 3 may be viewed as depicting an example of steps of a method implemented in the media editing device 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, a digital image is obtained, where the digital image depicts an individual with hair overlapping a portion of at least one eyebrow of the individual. In some instances, the hair overlaps the eyebrow at an angle. At block 320, a facial region of an individual in the digital image is identified. At block 330, the skin or hair color of the facial region is determined. At block 340, eyebrow regions in the facial region are identified. At block 350, each of the eyebrow regions is partitioned into a plurality of segments. At block 360, the media editing device 102 determines, for one or more of the segments, whether an area above or an area below the segment has a color matching the skin or the hair color.

At block 370, in response to determining that an area above or that an area below the segment has a color matching the skin or the hair color, the media editing device 102 identifies one or more verified eyebrow regions. For some embodiments, a segment is designated as a verified eyebrow region if the area above or that the area below the segment has a color matching the skin color. If the area above or the area below the segment does not have a color matching the skin color, the segment is designated as an overlapped region (with respect to the hair region), and vice versa with regards to the hair color. In block 380, a special effect intended for the eyebrow is applied only to the verified eyebrow region. Thereafter, the process in FIG. 3 ends.

Figure 4:
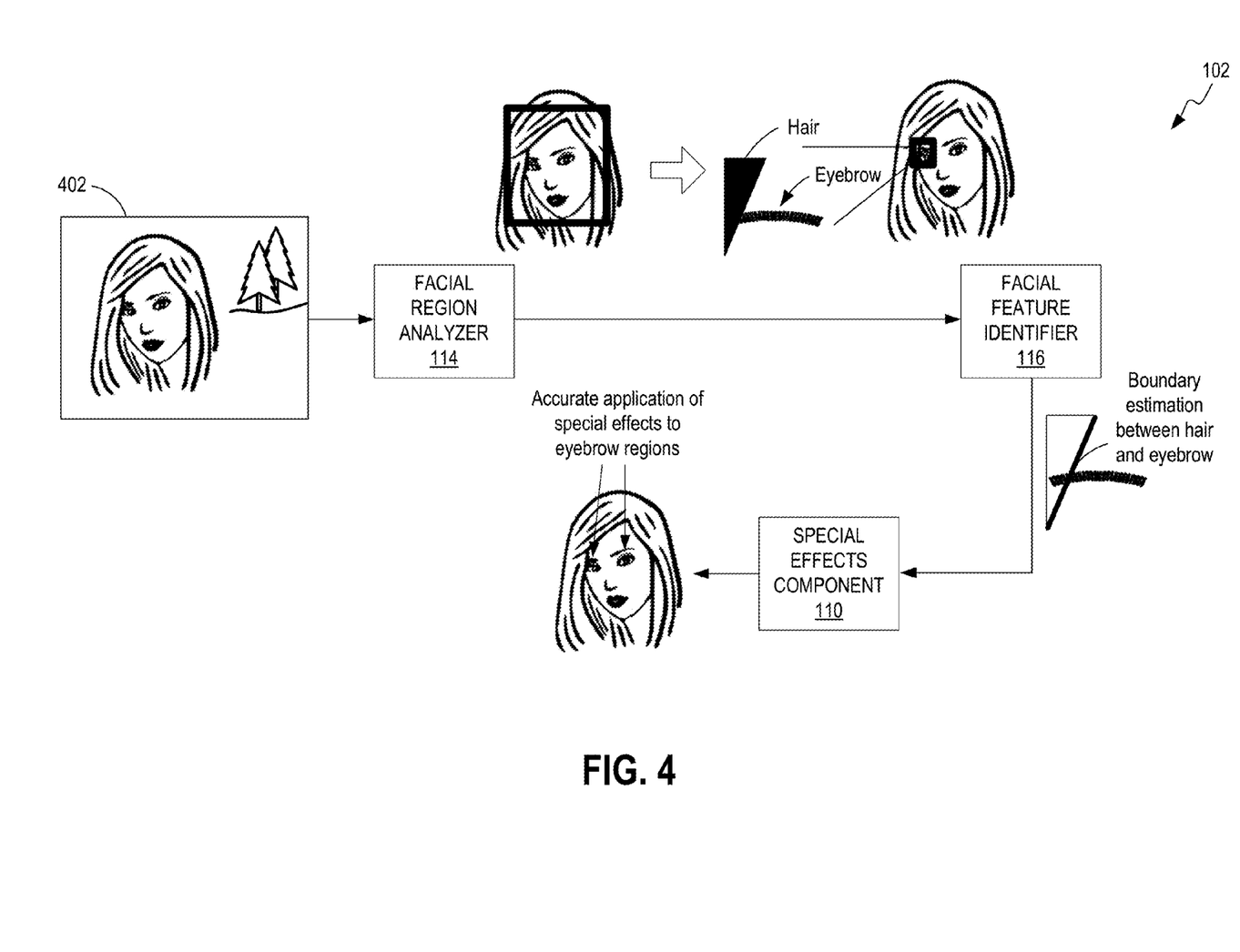
FIG. 4 illustrates the signal flow between various components of the media editing device of FIG. 1 for performing hair-eyebrow detection according to various embodiments of the present disclosure.

FIG. 4 illustrates the signal flow between various components of the media editing device 102 of FIG. 1 for performing hair-eyebrow detection for media editing purposes. To begin, the facial region analyzer 114 obtains a digital image 402 and identifies the general location of the facial region of an individual depicted in the digital image 402. The facial feature identifier 116 further identifies the general location of facial features (e.g., eyes, hair, nose, lips) within the facial region. The facial region analyzer 114 may also determine the skin color associated with the face, where the skin color is utilized by the facial feature identifier 116 to more accurately define the boundaries of the hair and eyebrows of the individual.

Based on the general location of facial features identified by the facial region analyzer 114, the facial feature identifier 116 further refines facial feature points within the facial region, where one or more cosmetic special effects are then applied to a region enclosed by the facial feature points by the special effects component 110. In some instances, the facial feature points may comprise the eyebrows of an individual depicted in the media content, where the facial feature identifier 116 performs hair-eyebrow detection at the pixel level. Specifically, the facial feature identifier 116 may be configured to distinguish the eyebrows of the individual from other facial features that may overlap with the eyebrows, namely the individual's hair. The boundaries of the hair and eyebrows are refined. Based on the identified facial feature points, the special effects component 110 applies one or more cosmetic special effects to the identified facial feature. For example, the special effects component 110 may apply a particular color of cosmetic makeup to the eyebrows identified by the facial feature identifier 116.

Figure 5:
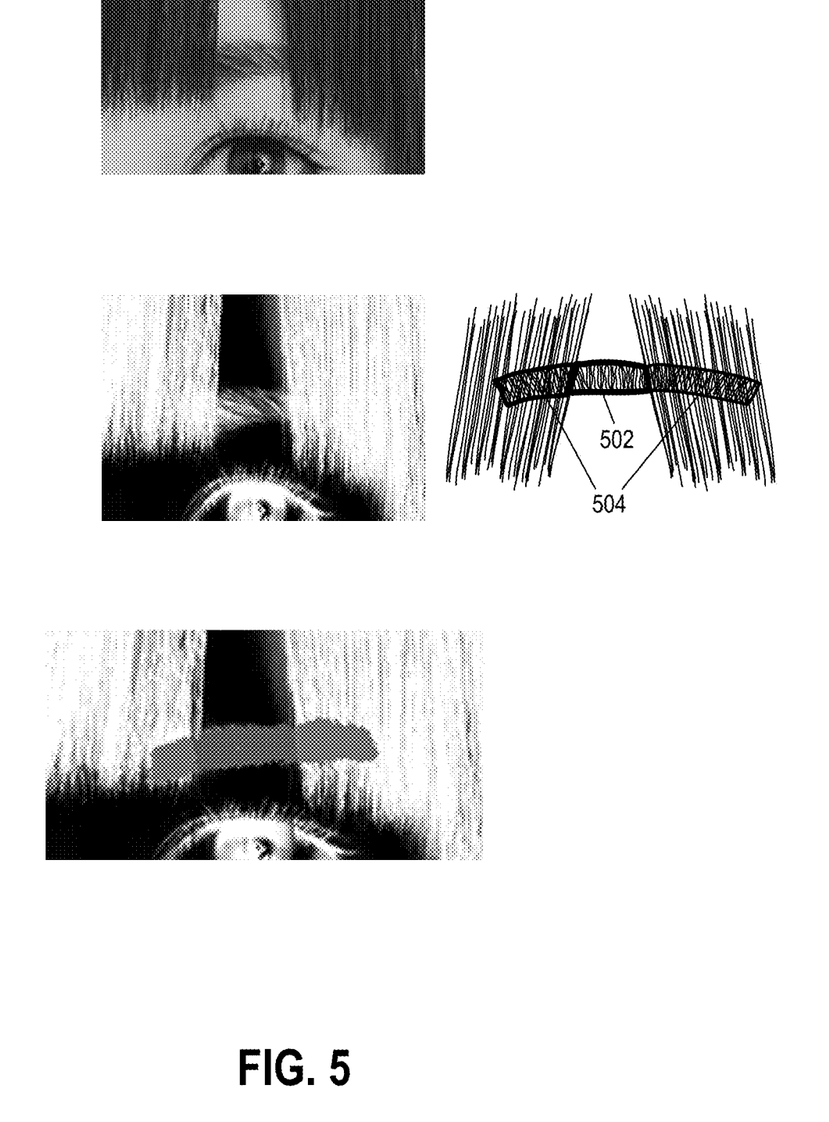
FIG. 5 illustrates use of a skin mask for identifying the hair region and eyebrow region according to various embodiments of the present disclosure.

Reference is made to FIG. 5, which illustrates use of a skin mask for identifying the hair region and eyebrow region. In some embodiments, the skin color of the individual's face is determined and a skin mask is generated. The skin mask may be a binary mask, whereby the skin color of the individual's face is assigned one color and the hair and eyebrow regions are assigned another color. Note, however, that the skin mask is not limited to being a binary mask. From the pixels of the facial region, the values of pixels are averaged to determined skin color. In the example skin mask shown, the hair and eyebrow regions are white.

In the example shown in FIG. 5, the media editing device 102 only distinguishes between a skin region and a non-skin region, where the non-skin region may include the individual's hair and/or eyebrows. The facial feature identifier 116 identifies each facial feature point predetermined for specific features such as the eyes, eyebrows, facial contour, lips, nose, and so on. For example, a facial alignment technique may be utilized by the facial feature identifier 116, where after each facial feature is identified, the eyebrow region is further determined based on the facial features. Note that in the example of FIG. 5, although the eyebrow region is identified, a portion of the eyebrow is covered by the individual's hair while the remaining portion of the eyebrow region does not overlap with the individual's hair. In accordance with various embodiments, the eyebrow is separated into two regions—a verified eyebrow (non-overlapped with respect to the hair) region 502 and a hair (overlapped) region 504.

Figure 6:
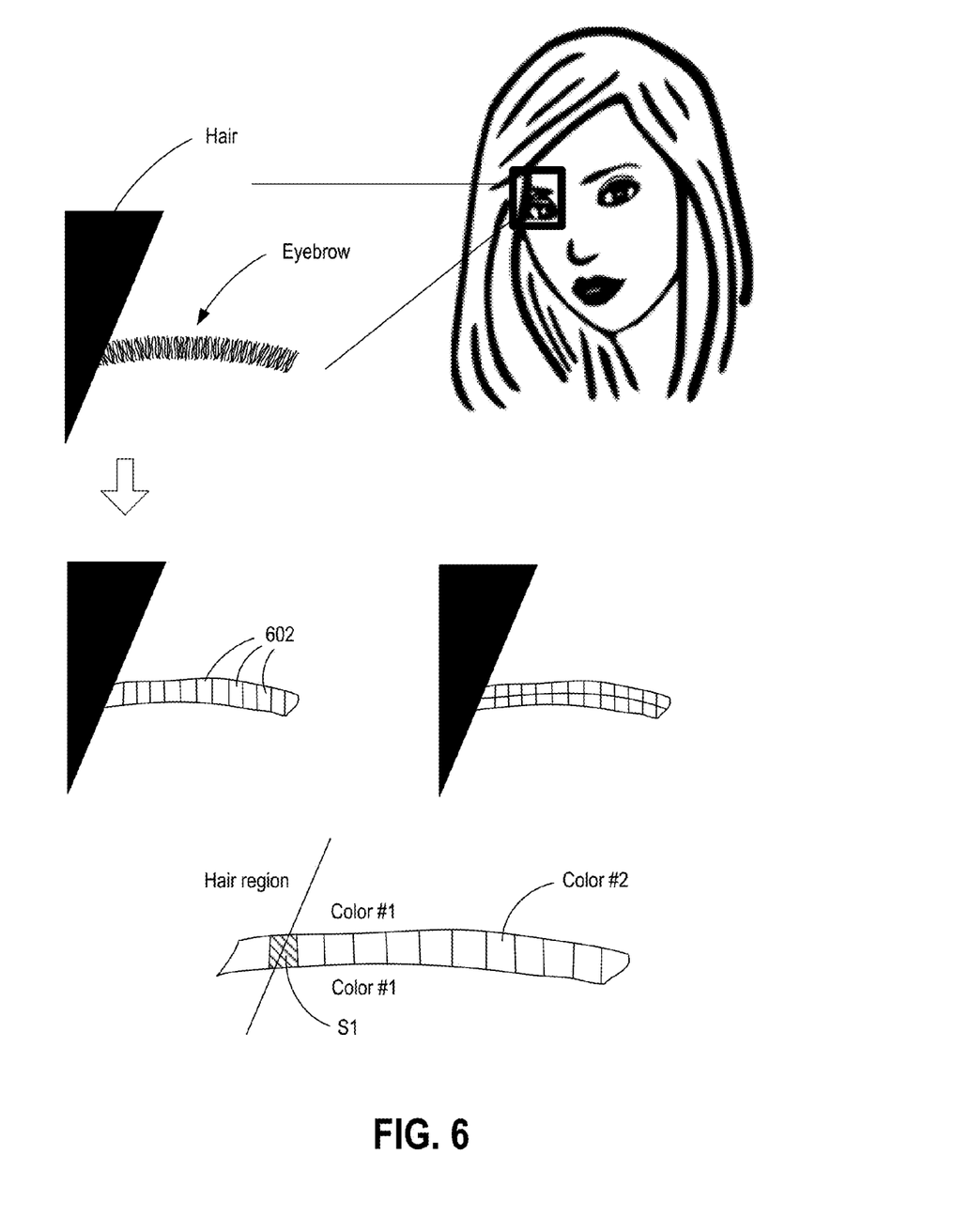
FIG. 6 illustrates partitioning of the eyebrow region according to various embodiments of the present disclosure.

Reference is made to FIG. 6, which illustrates partitioning of the eyebrow region. To facilitate identification of the boundaries surrounding the eyebrow regions, the eyebrow region may be partitioned into smaller segments 602, whereby the areas surrounding each segment 602 are examined. For example, if an area above a segment 602 and/or an area below a segment 602 has a color that matches the previously-identified skin color (e.g., Color #1 in FIG. 6), then the segment 602 may lie on a boundary between the eyebrow region and the remainder of the individual's face (e.g., the forehead). In some instances, a segment 602 may include two colors (Color #1 and Color #2 in FIG. 6). This can occur if the identified eyebrow region is not precise enough and contains a portion of the region outside the eyebrow. In such instances, the boundary defining the eyebrow region can be adjusted to exclude the region having a color that matches the previously-identified skin color. In some embodiments, the eyebrow region may be partitioned into a single row of segments 602. Alternatively, the eyebrow region may be partitioned into multiple rows and/or columns of segments 602. Partitioning the eyebrow region into a higher number of segments 602 will generally yield more accurate results. In some instances, the area below the column segment S1 may have a color that matches the skin color, but the area above the segment may have a color that does not match the skin color. In such instances, the segment S1 is considered to be the closest area to the hair region.

Figure 7:
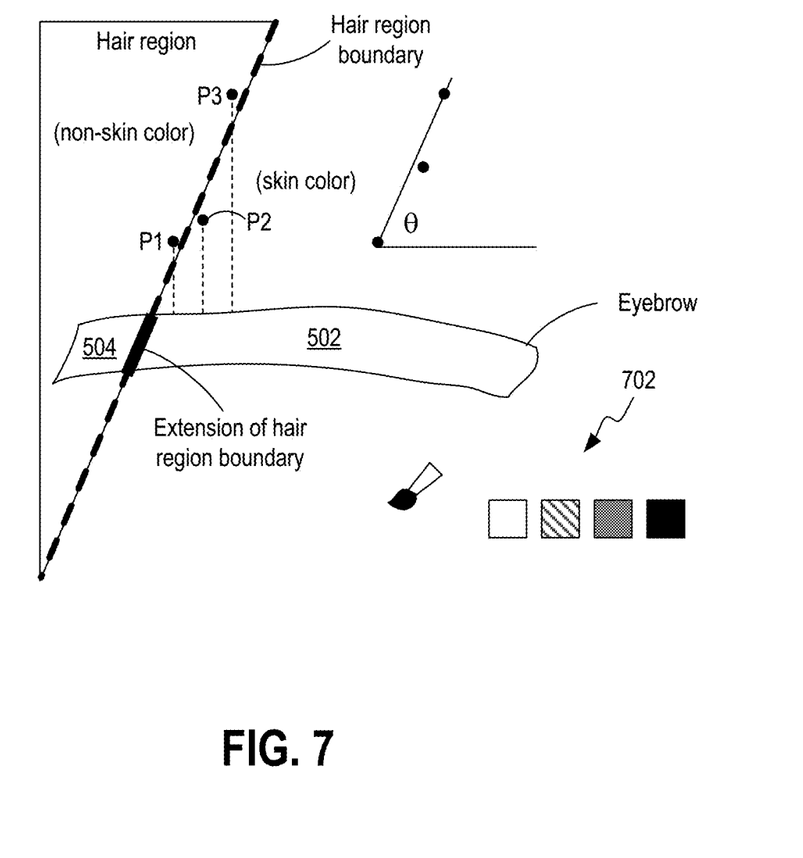
FIG. 7 illustrates extension of the boundary of the hair region at a region where the hair region and the eyebrow regions overlap according to various embodiments of the present disclosure.

FIG. 7 illustrates how the boundary of the hair region may be extended at the region where the hair region and the eyebrow regions overlap based on the determined boundaries of the segments of the eyebrow regions. As previously discussed in connection with FIG. 5, the system determines whether the eyebrow is separated into two regions—a verified eyebrow region 502 and a hair region 504. The verified eyebrow region 502 corresponds to the portion of the eyebrow that does not overlap with the hair. In accordance with various embodiments, the boundary of the hair region (shown by the dashed line) is determined based on at least two points (e.g., points P1, P2, P3 shown in FIG. 7) where the color transitions from the skin color to a non-skin color above the verified eyebrow region.

As shown, the boundary of the hair region can be extended based on the location of the verified eyebrow region 502 and the angle (θ) corresponding to a line extending between the points where the color transitions from the skin color to a non-skin color above the verified eyebrow region, as shown by the bold line in FIG. 7. In other embodiments, the boundary of the hair region may be derived based on an aggregation among the at least two points. Linear regression is one example of aggregation that may be applied among the points. Polynomial fitting/regression is another example. Once the boundaries of the hair region and the verified eyebrow region 502 have been defined, special effects intended for the eyebrow are applied only to the verified eyebrow region 502 using special effects components 702, which may include, for example, a paintbrush tool and a color palette for painting the verified eyebrow region 502. Thus, the eyebrows can be automatically and accurately enhanced with a color specified by the user for cosmetic makeup purposes without being influenced by the hair style of the individual.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a media editing device, comprising:
   obtaining a digital image depicting an individual with hair overlapping a portion of at least one eyebrow of the individual, the hair overlapping the portion of the at least one eyebrow at an angle;
   identifying a facial region of an individual in the digital image by a facial region analyzer;
   identifying a plurality of facial features of the facial region by a facial feature identifier;
   determining a skin color of the facial region;
   identifying eyebrow regions in the facial region based on the facial features;
   partitioning each of the eyebrow regions into a plurality of segments;
   determining, for one or more of the segments, whether an area above or an area below the segment has a color matching the skin color;
   in response to determining that the area above or that the area below the segment has a color matching the skin color, designating the segment as a verified eyebrow region;
   in response to determining that the area above or that the area below the segment does not have a color matching the skin color, designating the segment as an overlapped region; and
   applying a special effect to the verified eyebrow region.

2. The method of claim 1, further comprising:
   determining a boundary of a hair region based on at least two points where a color transitions from the skin color to a non-skin color above or below the verified eyebrow region; and
   extending the boundary of the hair region based on an angle between the at least two points.

3. The method of claim 2, further comprising identifying pixels falling within the verified eyebrow regions based on the extended boundary of the hair region and based on the verified eyebrow regions, wherein the special effect is applied to the identified pixels.

4. The method of claim 1, wherein applying the special effect on the verified eyebrow region comprises applying the special effect only to the verified eyebrow regions and not to the overlapped region.

5. The method of claim 1, further comprising:
   determining a boundary of a hair region based on at least two points where a color transitions from the skin color to a non-skin color above the verified eyebrow region; and
   extending the boundary of the hair region based on an aggregation among the at least two points.

6. The method of claim 1, wherein a set of the facial features comprises a plurality of eyebrow feature points, wherein identifying eyebrow regions in the facial region comprises:
   connecting each eyebrow feature point to determine the eyebrow region.

7. The method of claim 1, wherein partitioning each of the eyebrow regions into a plurality of segments comprises:
   partitioning the eyebrow regions into at least one row of segments.

8. The method of claim 1, wherein partitioning each of the eyebrow regions into a plurality of segments comprises:
   partitioning the eyebrow regions into multiple columns of segments.

9. A system, comprising:
   a memory storing instructions; and
   a processor comprising a facial region analyzer and a facial feature identifier, the processor coupled to the memory and configured by the instructions to at least:
   obtain a digital image depicting an individual with hair overlapping a portion of at least one eyebrow of the individual, the hair overlapping the portion of the at least one eyebrow at an angle;
   identify a facial region of an individual in the digital image by a facial region analyzer;
   identify a plurality of facial features of the facial region by a facial feature identifier;
   determine a skin color of the facial region;
   identify eyebrow regions in the facial region based on the facial features;
   partition each of the eyebrow regions into a plurality of segments;
   determine, for one or more of the segments, whether an area above or an area below the segment has a color matching the skin color;
   in response to determining that the area above or that the area below the segment has a color matching the skin color, designate the segment as a verified eyebrow region;
   in response to determining that the area above or that the area below the segment does not have a color matching the skin color, designate the segment as an overlapped region; and
   apply a special effect to the verified eyebrow region.

10. The system of claim 9, wherein the processor is further configured by the instructions to:
    determine a boundary of a hair region based on at least two points where a color transitions from the skin color to a non-skin color above the verified eyebrow region; and
    extend the boundary of the hair region based on the angle between the least two points.

11. The system of claim 10, wherein the processor is further configured by the instructions to identify pixels falling within the verified eyebrow regions based on the extended boundary of the hair region and based on the verified eyebrow regions, wherein the special effect is applied to the identified pixels.

12. The system of claim 9, wherein a set of the facial features comprises a plurality of eyebrow feature points, and wherein the processor is configured by the instructions to identify eyebrow regions in the facial region by:
    connecting each facial feature to determine the eyebrow region.

13. The system of claim 9, wherein the processor is configured by the instructions to partition each of the eyebrow regions into a plurality of segments by partitioning the eyebrow regions into at least one row of segments.

14. The system of claim 9, wherein the processor is configured by the instructions to partition each of the eyebrow regions into a plurality of segments by partitioning the eyebrow regions into multiple columns of segments.

15. A non-transitory computer-readable medium embodying a program executable in a computing device, comprising:
    code for obtaining a digital image depicting an individual with hair overlapping a portion of at least one eyebrow of the individual, the hair overlapping the portion of the at least one eyebrow at an angle;
    code for identifying a facial region of an individual in the digital image by a facial region analyzer;
    code for identifying a plurality of facial features of the facial region by a facial feature identifier;
    code for determining a skin color of the facial region;
    code for identifying eyebrow regions in the facial region based on the facial features;

code for partitioning each of the eyebrow regions into a plurality of segments;

code for determining, for one or more of the segments, whether an area above or an area below the segment has a color matching the skin color;

code for designating the segment as a verified eyebrow region in response to determining that the area above or that the area below the segment has a color matching the skin color;

code for designating the segment as an overlapped region in response to determining that the area above or that the area below the segment does not have a color matching the skin color; and code for applying a special effect to the verified eyebrow region.

16. The non-transitory computer-readable medium of claim 15, further comprising:

code for determining a boundary of a hair region based on at least two points where a color transitions from the skin color to a non-skin color above the verified eyebrow region; and code for extending the boundary of the hair region based on the angle between the least two points.

17. The non-transitory computer-readable medium of claim 16, further comprising code for identifying pixels falling within the verified eyebrow regions based on the extended boundary of the hair region and based on the verified eyebrow regions, wherein the special effect is applied to the identified pixels.

18. The non-transitory computer-readable medium of claim 16, wherein the code for applying the special effect based on boundaries of the segments applies the special effect only to the eyebrow regions and not to the hair region.

19. The non-transitory computer-readable medium of claim 15, wherein a set of the facial features comprises a plurality of eyebrow feature points, and wherein the code for identifying eyebrow regions in the facial region connects each facial feature to determine the eyebrow region.

20. The non-transitory computer-readable medium of claim 15, wherein the code for partitioning each of the eyebrow regions into a plurality of segments partitions the eyebrow regions into at least one row of segments.

21. The non-transitory computer-readable medium of claim 15, wherein the code for partitioning each of the eyebrow regions into a plurality of segments partitions the eyebrow regions into multiple columns of segments.

22. A method implemented in a media editing device, comprising:

obtaining a digital image depicting an individual with hair overlapping a portion of at least one eyebrow of the individual, the hair overlapping the portion of the at least one eyebrow at an angle;

identifying a facial region of an individual in the digital image by a facial region analyzer;

identifying a plurality of facial features of the facial region by a facial feature identifier;

determining a hair color of the facial region;

identifying eyebrow regions in the facial region based on the facial features;

partitioning each of the eyebrow regions into a plurality of segments;

determining, for one or more of the segments, whether an area above or an area below the segment has a color matching the hair color;

in response to determining that the area above or that the area below the segment has a color matching the hair color, designating the segment as an overlapped region;

in response to determining that the area above or that the area below the segment does not have a color matching the hair color, designating the segment as a verified eyebrow region; and applying a special effect to the verified eyebrow region.

23. The method of claim 22, further comprising:

determining a boundary of a hair region based on at least two points where a color transitions from a non-hair color to the hair color above or below the verified eyebrow region; and extending the boundary of the hair region based on an angle between the at least two points.

* * * * *